(12) United States Patent
Mujtaba et al.

(10) Patent No.: US 8,848,568 B2
(45) Date of Patent: Sep. 30, 2014

(54) ADAPTIVE PARTIAL PACKET DECODING

(75) Inventors: Syed A. Mujtaba, Santa Clara, CA (US); Kee-Bong Song, Santa Clara, CA (US); Yuchul Kim, Santa Clara, CA (US); Xiaowen Wang, Cupertino, CA (US); Tarik Tabet, Los Gatos, CA (US); Youngjae Kim, San Jose, CA (US)

(73) Assignee: Apple Inc., Cupertino, CA (US)

( * ) Notice: Subject to any disclaimer, the term of this patent is extended or adjusted under 35 U.S.C. 154(b) by 240 days.

(21) Appl. No.: 13/567,136

(22) Filed: Aug. 6, 2012

(65) Prior Publication Data

US 2013/0250785 A1 Sep. 26, 2013

Related U.S. Application Data

(60) Provisional application No. 61/613,437, filed on Mar. 20, 2012.

(51) Int. Cl.
*H04W 24/00* (2009.01)
(52) U.S. Cl.
USPC .......................................... 370/252
(58) Field of Classification Search
CPC ... H04W 24/00; H04L 43/50; H04L 43/0852; H04L 43/08; H04B 17/003
USPC .......................................... 370/252, 241, 253
See application file for complete search history.

(56) References Cited

U.S. PATENT DOCUMENTS

| 5,406,613 | A | 4/1995 | Peponides et al. |
| 7,051,268 | B1 * | 5/2006 | Sindhushayana et al. ..... 714/786 |
| 2005/0283687 | A1 | 12/2005 | Sutivong et al. |

OTHER PUBLICATIONS

International Search Report and Written Opinion in Application No. PCT/US2013/030686, mailed Jul. 1, 2013, pp. 1-12.

* cited by examiner

*Primary Examiner* — Andrew Lai
*Assistant Examiner* — Zhiren Qin
(74) *Attorney, Agent, or Firm* — Meyertons, Hood, Kivlin, Kowert & Goetzel, P.C.

(57) ABSTRACT

A user device receives packets from a base station. The user device may invoke decoding while the packet is still being received, based on the incomplete contents of a given packet. This "partial packet decoding" relies on the fact that the underlying information in the packet is encoded with redundancy (code rate less than one). If link quality is poor, the partial packet decoding is likely to be unsuccessful, i.e., to fail in its attempt to recover the underlying information. To avoid waste of power, the user device may be configured to apply one or more tests of link quality prior to invoking the partial packet decoding on a current packet.

29 Claims, 6 Drawing Sheets

ADAPTIVE PARTIAL PACKET DECODING

PRIORITY CLAIM

The present application claims benefit of priority to U.S. Provisional Application No. 61/613,437 titled "Adaptive Partial Packet Decoding" and filed on Mar. 20, 2012, whose inventors are Syed Aon Mujtaba, Kee-Bong Song, Yuchul Kim, Xiaowen Wang, Tarik Tabet, and Youngjae Kim, and which is hereby incorporated by reference in its entirety as thought fully and completely set forth herein.

FIELD OF THE INVENTION

The present application relates to networked devices, and more particularly to a system and method for selectively invoking a process of partial packet decoding when link quality is sufficiently high.

DESCRIPTION OF THE RELATED ART

There are generally two types of network transmission systems, these being circuit-switched networks and packet-switched networks. In packet-switched networks, packets are transmitted in separate bursts. When packets are received, they are reassembled in the proper sequence to make up the message. In a circuit switched (CS) connection, packets are continuously sent from the network to the user equipment (UE), and vice versa. Hence, the receiver at the UE may be continuously decoding received packets.

In cellular networks, transmit (Tx) power for data transmission from the base station to the user equipment (e.g., the Dedicated Traffic Channel power in UMTS) is typically controlled to reduce co-channel interference, and also to save Tx power of the base station. In a CS connection, transmit power is controlled such that the base station uses the minimal amount of power to maintain link quality. However, the power control may not always be perfect. In some circumstances, the data packets received by the UE may have a higher SINR (Signal to Interference-and-Noise Ratio) than is necessary. Examples of such circumstances include one or more of the following: 1) the UE is very close to the base station, and the base station's transmit power cannot be lowered below its minimum Tx power limit; 2) the power control algorithm works imperfectly; 3) there is an inherent delay in the power control algorithm; and 4) excessive interference in the uplink channel makes it difficult for the base station to reliably decode transmission power control (TPC) bits sent by the UE.

Partial Packet Decoding (PPD) refers to a process whereby a data packet can be decoded based on partial reception of the packet even before the end of the packet has been reached. Partial packet decoding may be performed as long as the effective coding rate at the time of the decoding attempt is less than 1. If the decoding attempt is successful, the UE can immediately turn its receiver off to save power until the end of the packet. If the decoding is unsuccessful, the UE can make another decoding attempt after a certain period of time with more data from the packet. The UE can make multiple decoding attempts until the end of packet is reached.

One problem with Partial Packet Decoding is that each decoding attempt on a partial packet consumes a certain amount of power. If the UE ends up with multiple decoding attempts just for one packet, the UE can consume more power than if only one decoding attempt was made on the complete packet.

SUMMARY OF THE INVENTION

In one embodiment, a method for adaptively invoking partial packet decoding may involve the following operations. The method may be performed by a User Equipment (UE) device (also referred to as a communication device) such as a mobile phone or mobile device when receiving packets from a base station.

The communication device may determine whether a first measure of quality of a communication link (i.e., a wireless link with the base station) is better than a first quality standard in response to the start of a transmission period or interval for a current packet. The first measure of quality may be based, e.g., on block error rate or bit error rate. The first measure may be a measure that has been computed based on previously received packets. The determination of whether the first measure of quality is better than the first quality standard is used to determine if partial packet decoding should be enabled, i.e., to determine whether the possibility of partial packet decoding should be investigated. If the first measure of quality is not better than the first quality standard, then the method determines that power should not be wasted on partial packet decoding, and partial packet decoding is disabled.

In response to determining that the first measure of quality is better than the first quality standard, then partial packet decoding is enabled. When partial packet decoding is enabled, the communication device may: obtain a second measure of the quality of the communication link; determine whether the second measure of the quality of the communication link is better than a second quality standard; and perform a partial packet decoding process on the current packet until the end of the current packet in response to determining that the second measure is better than the second quality standard.

There are a wide variety of possibilities for the second measure of quality. For example, the second measure of quality may be based on a signal to noise ratio (or, a signal to interference ratio, or, a signal to interference-and-noise ratio) associated with the communication link. The second measure of quality may be derived from information contained in the current packet, in associated control information that is sent to the communication device for decoding the packet, and/or in other channels (e.g., pilot channel of which transmit power and transmit sequence is known).

If the first measure of quality is not better than the first quality standard or the second measure of quality is not better than the second quality standard, the communication device may disable partial packet decoding, wait until the end of the current packet, and invoke packet decoding based on the fully-received contents of the current packet.

BRIEF DESCRIPTION OF THE DRAWINGS

A better understanding of the present invention can be obtained when the following detailed description of the embodiments is considered in conjunction with the following drawings.

Figure 1:
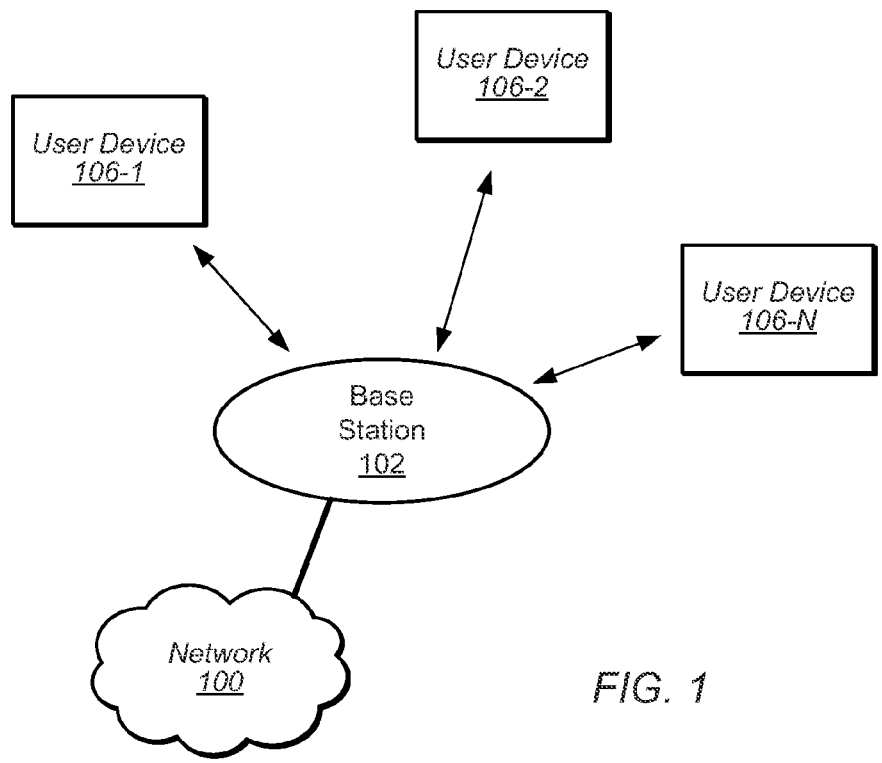
FIG. 1 illustrates an exemplary (and simplified) wireless communication system.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

The following acronyms are used in the present Patent Application.
APPD: Adaptive Partial Packet Decoding
BLER: Block Error Rate (same as Packet Error Rate)
BER: Bit Error Rate
CDMA: Code Division Multiple Access
CPICH: Common Pilot Indicator Channel
CRC: Cyclic Redundancy Check
CS: Circuit Switched
DL: Downlink
DPCH: Dedicated Physical Channel
DPDCH: Dedicated Physical Data Channel
DPCCH: Dedicated Physical Control Channel
DTCH: Dedicated Traffic Channel
Ec/Io: Ratio of chip energy of pilot channel to total power
NB: NodeB
PC: Power Control
PER: Packet Error Rate
PPD: Partial Packet Decoding
SINR: Signal to Interference-and-Noise Ratio
SIR: Signal to Interference Ratio
SNR: Signal to Noise Ratio
TPC: Transmit Power Control
TDM: Time Domain Multiplexing
TDMed: Time Domain Multiplexed
TFCI: Transport Format Combination Indicator
TTI: Transmission Time Interval
Tx: Transmission
UE: User Equipment
UL: Uplink
UMTS: Universal Mobile Telecommunication System Communication System FIG. 1 illustrates an exemplary (and simplified) wireless communication system. It is noted that the system of FIG. 1 is merely one example of a possible system, and embodiments of the invention may be implemented in any of various systems, as desired.

As shown, the exemplary wireless communication system includes a base station 102 which communicates over a transmission medium with one or more user devices 106-1 through 106-N. Each of the user devices may be referred to herein as a "user equipment" (UE). Thus, the user devices are collectively referred to as UEs.

The base station 102 may be a base transceiver station (BTS) or cell site, and comprises hardware that enables wireless communication with the user devices 106-1 through 106-N. The base station 102 may also be equipped to communicate with a network 100. Thus, the base station 102 may facilitate communication between the user devices and/or between the user devices and the network 100. When the communication system conforms to the UTMS standard, the base station 102 may be referred to as the "NodeB". UTMS is a third generation (3G) mobile cellular technology.

The base station 102 and the UE devices may be configured to communicate over the transmission medium using any of various wireless communication technologies such as GSM, CDMA, WLL, WAN, WiFi, WiMAX etc.

Figure 2:
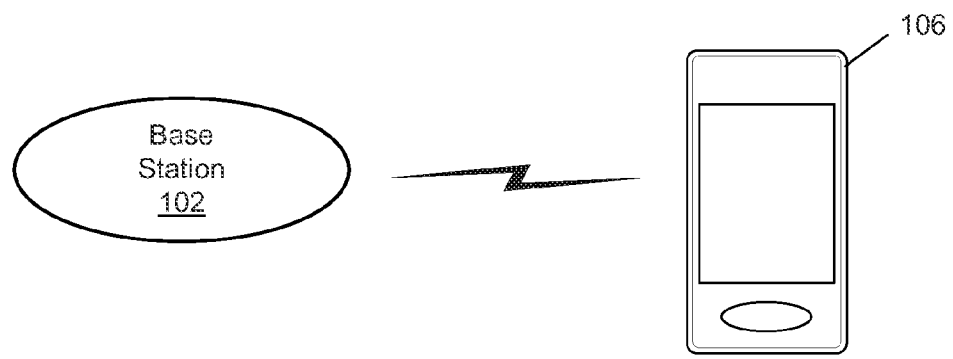
FIG. 2 illustrates a base station 102 in communication with user equipment 106.

FIG. 2 illustrates user equipment (UE) 106 (e.g., one of the devices 106-1 through 106-N) in communication with the base station 102. The UE 106 may be a device with wireless network connectivity such as a mobile phone, a hand-held device, a computer or a tablet, or virtually any type of wireless device. The UE 106 may include a processor that is configured to execute program instructions stored in memory. The UE 106 may perform any of the methods embodiments described herein by executing such stored instructions. In some embodiments, the UE 106 may include a programmable hardware element such as an FPGA (field-programmable gate array) that is configured to perform any of the method embodiments described herein, or any portion of any of the method embodiments described herein.

In some embodiments, the UE 106 is configured to adaptively employ Partial Packet Decoding (PPD). For example, in some embodiments the UE 106 may be configured to use Partial Packet Decoding only when the link quality is determined to be sufficient or "good enough". As described herein, the quality of the link can be measured by any of various metrics, e.g., by one or more of the following metrics: the Block Error Rate (BLER), the Bit Error Rate (BER), the sequence of the downlink power control bits, the Signal to Noise Ratio (SNR) of the Uplink TPC bits signaled in the downlink, the SNR (Ec/Io) of the common pilot channel, e.g., Common Pilot Channel (CPICH) in UMTS, the SNR of the dedicated control channel, e.g., Dedicated Physical Control Channel (DPCCH) in UMTS, etc.

Figure 3:
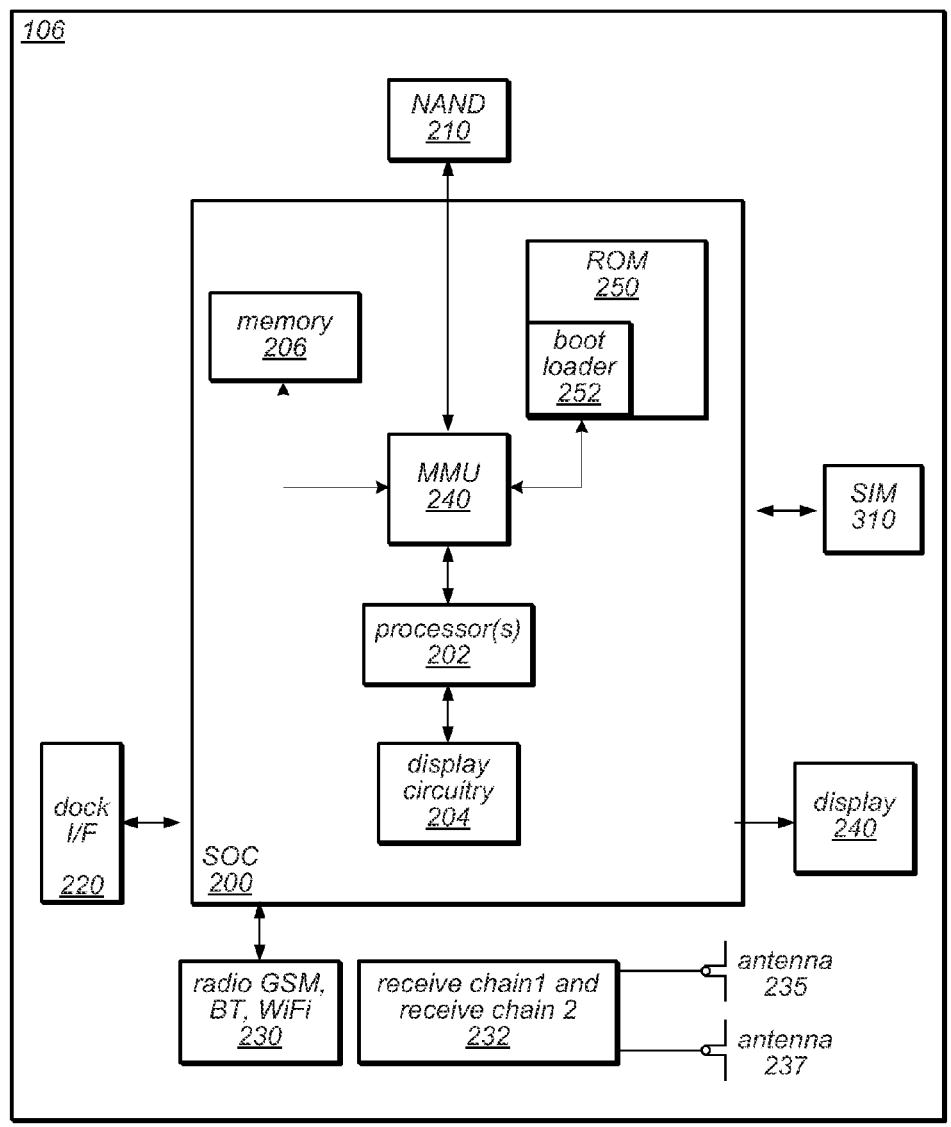
FIG. 3 illustrates an exemplary block diagram of a user equipment device, according to one embodiment.

FIG. 3—Exemplary Block Diagram of a UE

FIG. 3 illustrates an exemplary block diagram of a UE 106. As shown, the UE 106 may include a system on chip (SOC) 200, which may include portions for various purposes. For example, as shown, the SOC 200 may include processor(s) 202 which may execute program instructions for the UE 106 and display circuitry 204 which may perform graphics processing and provide display signals to the display 240. The processor(s) 202 may also be coupled to memory management unit (MMU) 240, which may be configured to receive addresses from the processor(s) 202 and translate those addresses to locations in memory (e.g., memory 206, read only memory (ROM) 250, NAND flash memory 210) and/or to other circuits or devices, such as the display circuitry 204, radio 230, connector I/F 220, and/or display 240. In some embodiments, the MMU 240 may be included as a portion of the processor(s) 202.

In the embodiment shown, ROM 250 may include a bootloader 252, which may be executed by the processor(s) 202 during boot up or initialization. As also shown, the SOC 200 may be coupled to various other circuits of the UE 106. For example, the UE 106 may include various types of memory (e.g., including NAND flash 210), a connector interface 220 (e.g., for coupling to the computer system), the display 240, and wireless communication circuitry (e.g., for LTE, CDMA2000, Bluetooth, WiFi, etc.).

The UE device 106 may include at least one antenna, and in some embodiments multiple antennas, for performing wireless communication with base stations. For example, the UE device 106 may use antennas 235 and 237 to perform the wireless communication. The UE 106 may be configured to communicate wirelessly using multiple (e.g., at least two) radio access technologies (RATs).

As shown, the UE 106 may include a SIM (Subscriber Identity Module) 310, which may also be referred to as a smart card. The SIM 310 may take the form of a removable SIM card. As one example, the SIM 310 may be a Universal Integrated Circuit Card (UICC) 310. In some embodiments, the SIM 310 may store a preferred roaming list (PRL) which is used for roaming on various telecommunication networks.

The processor 202 of the UE device 106 may be configured to implement part or all of the methods described herein, e.g., by executing program instructions stored on a memory medium (e.g., a non-transitory computer-readable memory medium). In other embodiments, processor 202 may be configured as programmable hardware element, such as an FPGA (Field Programmable Gate Array), or as an ASIC (Application Specific Integrated Circuit).

FIG. 4

Figure 4:
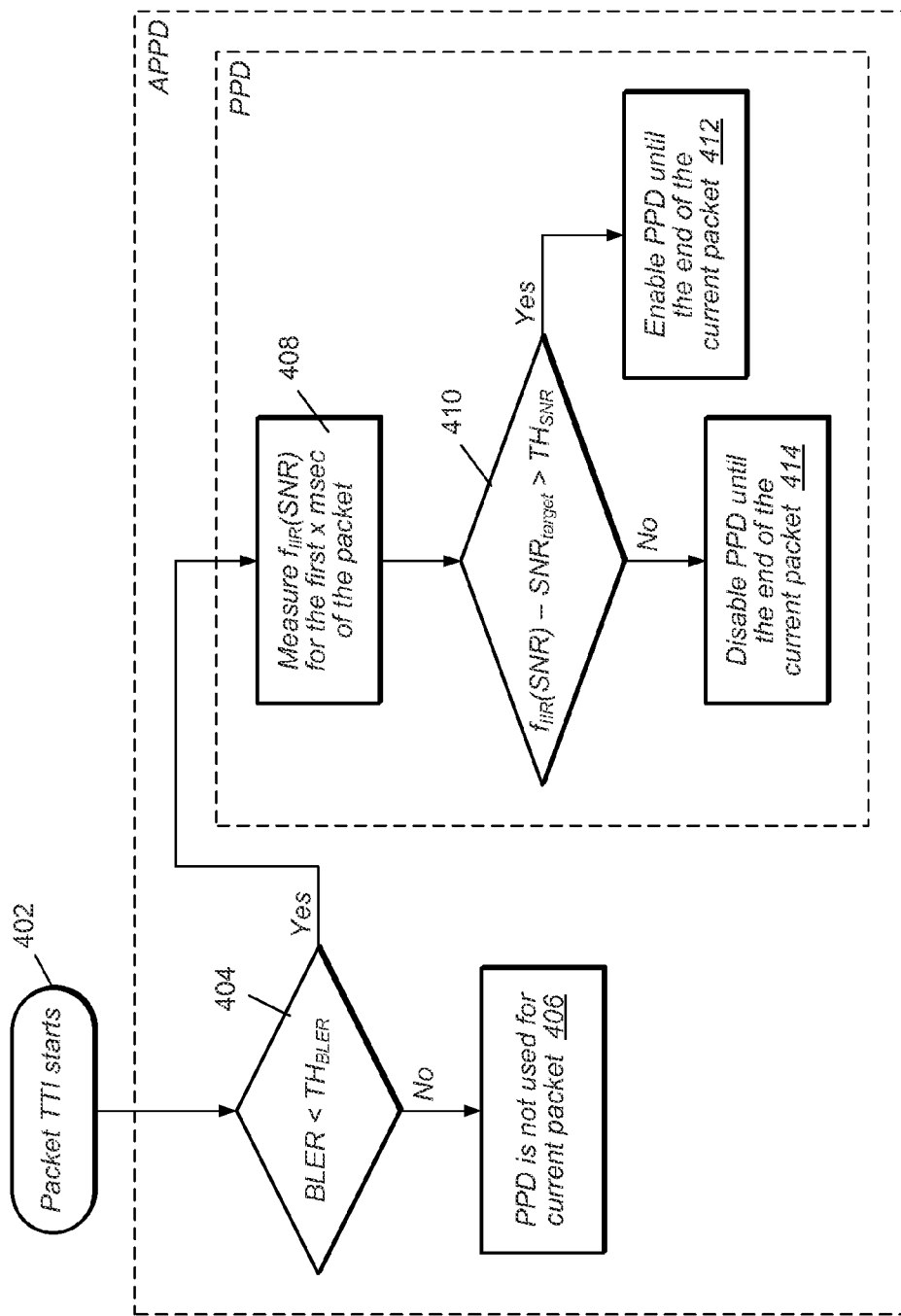
FIG. 4 is a flowchart for one embodiment of a method for selectively enabling a partial packet decoding process, based on block error rate and signal to noise ratio.

FIG. 4 is a flowchart diagram of one embodiment of a method for performing adaptive partial packet decoding. This method is performed by the UE 106.

At 402, the transmission time interval (TTI) starts for a current packet. When the TTI starts, the UE 106 performs the following operations.

At 404, the method evaluates a first condition for enabling partial packet decoding (PPD) on the current packet. The first condition may be based on a Block Error Rate (BLER). More specifically, the method determines if the BLER is less than a BLER Threshold ($TH_{BLER}$). If not, then partial packet decoding is not used for the current packet as indicated at 406. Thus, at 404 the method effectively implements a BLER-based PPD gating condition. In a power-controlled downlink channel, its BLER is updated every packet (or TTI) by the UE 106, and the Signal to Noise Ratio (SNR) target is adjusted based on the current BLER. The BLER is thus used as a gating criterion for partial packet decoding. If BLER<$TH_{BLER}$ in the current packet TTI, then control passes to 408. In an alternative embodiment, the Bit Error Rate (BER) may be used instead of BLER. Any of various other methods or techniques may be used to assess the quality of the communication link as a gating condition for applying PPD.

If the Block Error Rate (BLER) is less than the BLER Threshold ($TH_{BLER}$), then the method advances to 408.

At 408, the method measures a Signal to Noise Ratio (SNR) for the first x milliseconds of the current packet. (In alternative embodiments, SIR or SINR may be measured instead of SNR.) In different embodiments, the value x may have different values in the range, e.g., from 2 to 18 milliseconds in UMTS. For example, the value x may have different values anywhere in the range from 1-5 to 15-20 milliseconds. In some embodiments, the first x milliseconds may cover a given fractional portion of the packet. The given fractional portion may range from, e.g., 30% to 70% of the packet. For example, the given fractional portion may range anywhere from 20-40% to 60-80%. In some embodiments, the method may make a plurality of SNR measurements during the first x milliseconds, and filter the SNR measurements with a digital filter (e.g., an IIR filter). For example, the packet may include a plurality of slots, and an SNR may be determined for each of the slots occurring in the first x milliseconds. The slot SNRs may then be filtered.

In one embodiment, the filter is an IIR filter of the form:

$$y_n = (1-\alpha)^* y_{n-1} + \alpha^* SNR_n,$$

where $SNR_n$ denotes the $n^{th}$ SNR measurement of the first x milliseconds, where $\alpha$ is a positive constant that is less than one. The filter output value $y_n$ may also be denoted by $f_{IIR}(SNR_n)$. The IIR filter may be initialized with $y_0=0$ (or with $y_0=SNR_0$). Any of various other filter structures may be used.

At 410, the method may evaluate a second condition for enabling partial packet decoding on the current packet. In one embodiment, the second condition is based on the SNR (or SIR or SINR) measured at 408, e.g., based on the output value of the above-described filter at the end of the first x milliseconds. (The measured SNR represents a short term measure of link quality whereas the BLER represents a longer term measure of link quality.) In the power-controlled downlink channel, the UE 106 compares the measured SNR with the current SNR target for the downlink channel. For example, if $f_{IIR}(SNR)-SNR_{target} > TH_{SNR}$, then link quality is declared to be good enough so that partial packet decoding may be enabled until the end of the current packet as indicated at 412. (With partial packet encoding being enabled, the UE may make one or more attempts to decode the packet. Each attempt may be based on the amount of the packet data that has accumulated up to the time of the attempt. Of course, if a given attempt is successful (e.g., as indicated by a successful CRC test), no further attempt need be made.)

Conversely, if $f_{IIR}(SNR)-SNR_{target} < TH_{SNR}$, then partial packet decoding is disabled for the current packet as indicated at 414. After the current packet is fully received, a decoding based on the fully-received contents of the current packet is performed.

Any of various measures of link quality may be measured at 408 and used at 410 instead of (or, in addition to) SNR. For example, in various embodiments, one or more (or, two or more, or all) of the following conditions may be used.

1) Power Control command-based: The number of DOWN commands in the past N power control commands is larger than a threshold M.

2) CPICH SNR-based: $f_{IIR}(CPICH\_SNR) > TH_{CPICH\_SNR}$, where CPICH_SNR is the SNR derived from the Common Pilot Channel (CPICH).

3) TPC-SNR based: $f_{IIR}(UL\_TPC\_SNR) > TH_{UL\_TPC\_SNR}$, where UL_TPC_SNR is an SNR associated with the Uplink TPC that is sent through the DL channel, e.g., Dedicated Physical Control Channel (DPCCH) in UMTS, which is time-domain multiplexed (TDMed) with DPDCH.

With respect to condition 2) above, it is noted that $TH_{CPICH\_SNR}$ can be dynamically updated considering zero, one or more factors, e.g., the relation between CPICH code power and DPCCH code power, and/or target SNR for downlink power control. "Code power" means the amount of transmit power allocated to a specific physical layer code channel.

With respect to condition 3) above, $TH_{UL\_TPC\_SNR}$ can be dynamically updated considering zero, one or more other factors, e.g., the relation between UL_TPC power and the power of a dedicated pilot, e.g., dedicated pilot power in DPCCH in UMTS, and/or target SNR for downlink power control.

Figure 5:
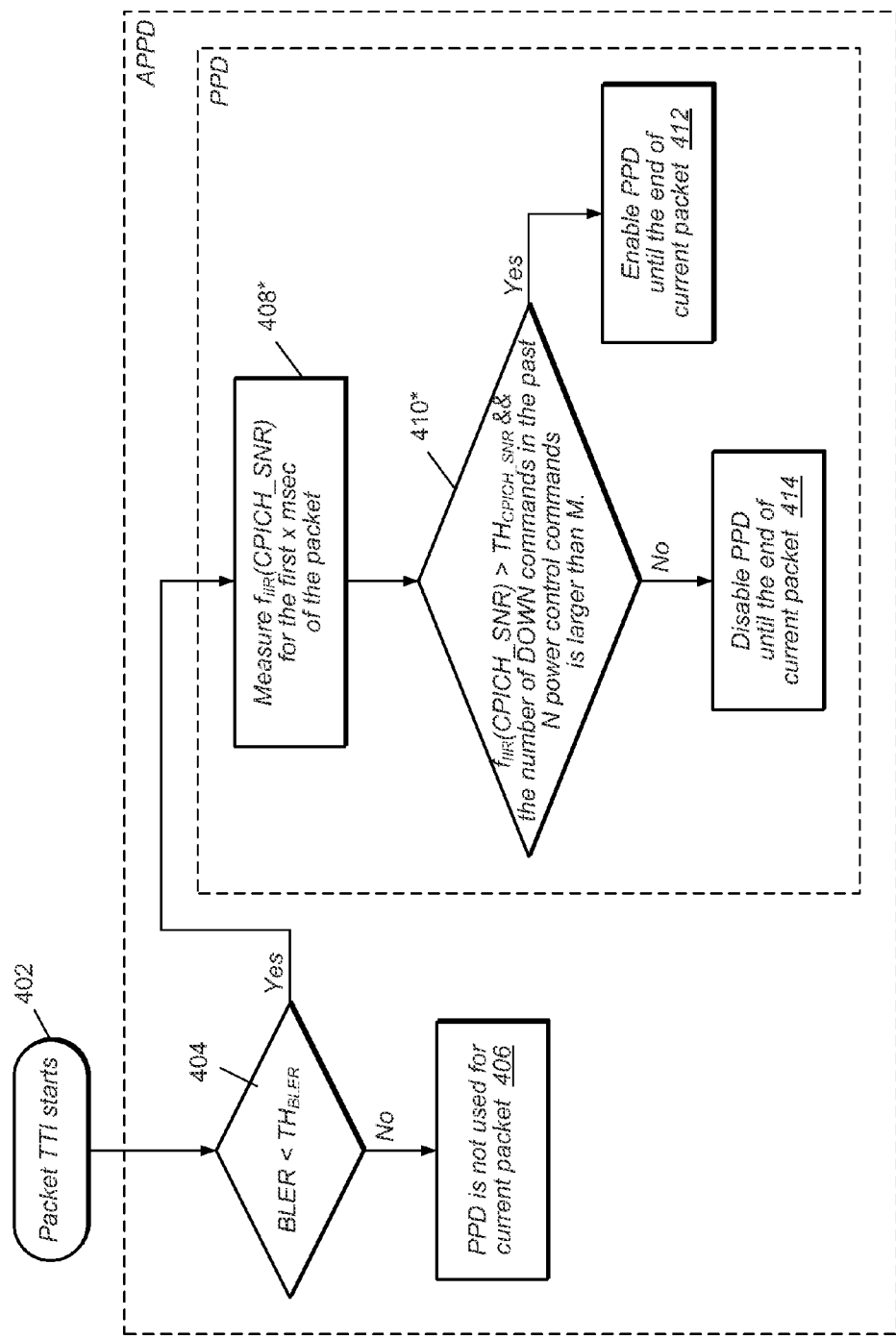
FIG. 5 is a flowchart for one embodiment of a method for selectively enabling a partial packet decoding process, based on block error rate and a composite of a signal to noise ratio and a number of power control DOWN commands.

FIG. 5 shows an alternative embodiment of the method for performing adaptive partial packet decoding. At 408*, instead of SNR, the UE measures $f_{IIR}(CPICH\_SNR)$. At 410*, the UE evaluates the logical AND of the condition $$f_{IIR}(CPICH\_SNR) > TH_{CPICH\_SNR}$$

and the condition that the number of DOWN commands in the past N power control commands is larger than M. The remaining steps of this alternative embodiment are similar to the like numbered steps of the FIG. 4 embodiment.

Figure 6:
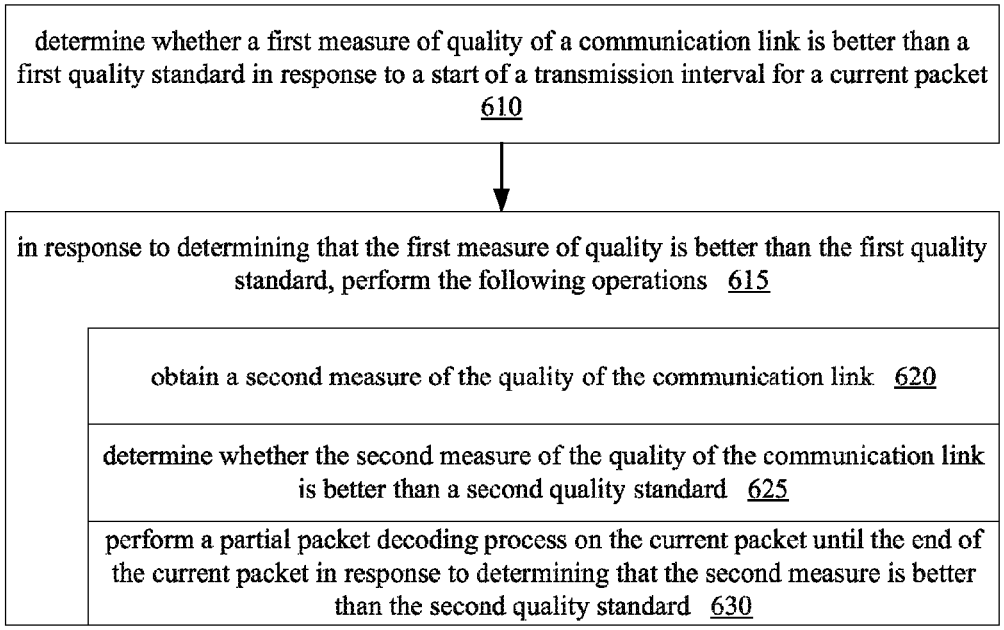
FIG. 6 is a flowchart showing one embodiment of a method for controlling the performance of a partial packet decoding process, based on two link quality tests.

FIG. 6 illustrates one embodiment of a method for controlling the performance of partial packet decoding based on two measures of link quality. The method may be performed by the user equipment 106 of a communication system. See, e.g., FIGS. 1 and 2. The method may include any subset of the features described above in connection with FIGS. 1-5.

At 610, the user equipment may determine whether a first measure of quality of a communication link is better than a first quality standard in response to a start of a transmission interval for a current packet. The first measure of quality may be block error rate or bit error rate, or any other desired measure.

At 615, the user equipment may perform the operations 620-630 in response to determining that the first measure of quality is better than the first quality standard.

At 620, the user equipment may obtain a second measure of the quality of the communication link. The second measure of quality may be any of those measures discussed above or any logical combination of those measures. The second measure may be a measure derived from the current packet, e.g., an initial portion of the current packet.

At 625, the user equipment may determine whether the second measure of the quality of the communication link is better than a second quality standard. The determination may take the form of an inequality test, as variously described above.

At 630, the user equipment may perform a partial packet decoding process on the current packet (until the end of the current packet) in response to determining that the second measure is better than the second quality standard. The partial packet decoding process may be performed as variously described above.

In some embodiments, the second measure of quality is a signal to noise ratio (SNR) of associated with the communication link. Alternatively, the second measure may be a signal to interference ratio (SIR) or a signal to interference-and-noise ratio (SINR) of associated with the communication link.

In some embodiments, the second measure includes a number of power control DOWN commands transmitted to the base station. See, e.g., FIG. 5.

In some embodiments, the second measure of quality is based on information contained in the current packet, e.g., in the first x milliseconds of the current packet as described above.

In some embodiments, the partial packet decoding process on the current packet may include making one or more attempts to decode the current packet. Each of the one or more attempts is based on an amount of data of the current packet that has been received up to the time of the attempt.

In some embodiments, the partial packet decoding process is performed after waiting a predetermined amount of time from the start of the transmission interval, e.g., as variously described above. The predetermined amount of time is selected so that an effective coding rate of a received portion of the current packet after the predetermined amount of time is less than one.

In some embodiments, the action of obtaining the second measure of quality includes obtaining measurements for a predetermined amount of time from the start of the transmission interval, where the predetermined amount of time is selected so that an effective coding rate of a received portion of the current packet after the predetermined amount of time is less than one.

Downlink Power Control in UMTS

A. DTCH-Inner Loop PC (ILPC)

Figure 7:
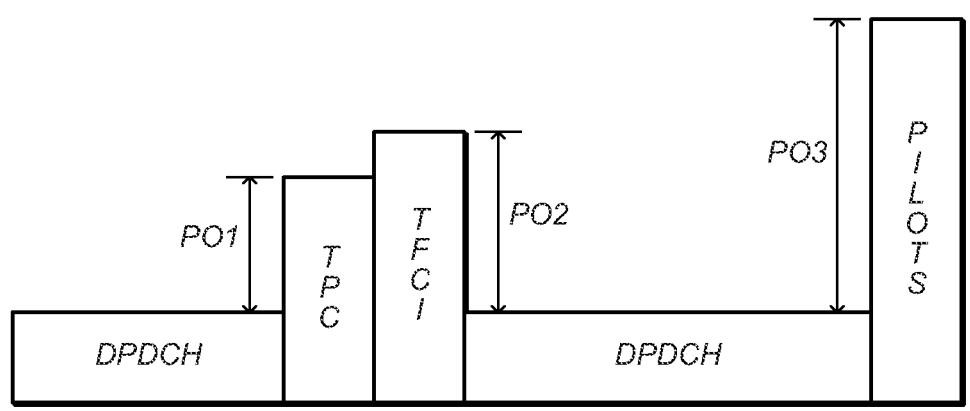
FIG. 7 illustrates the structure of a slot for the Dedicated Physical Channel (DPCH) in UTMS.

In some embodiments, in every slot (there are 15 slots in a 10 ms frame) a dedicated pilot is sent to the UE to measure received SIR. FIG. 7 shows one embodiment for the structure of a slot. The measured SIR may be compared against an SIR target that is derived from measured BLER. If SIR<$SIR_{target}$, then the UE sends an UP(+) command to the base station 102; otherwise it sends a DOWN(−) command to the base station 102. The UP command directs the base station to increase the power of its transmissions on the DL channel, e.g., DPDCH and DPCCH in UMTS. The DOWN command directs the base station to decrease the power of its transmissions on the DL channel, e.g., DPDCH and DPCCH in UMTS. One TPC command is sent from UE to the base station for every slot.

B. DTCH-Outer Loop PC (OLPC)

If BLER>$BLER_{target}$, then the UE increases its $SIR_{target}$ by an amount $\Delta_{Plus}$ in dB; otherwise the UE decreases its $SIR_{target}$ by an amount $\Delta_{Minus}$ in dB. The parameters $\Delta_{Plus}$ and $\Delta_{Minus}$ may be selected to achieve a desired BLER. For example, $\Delta_{plus}$=1 dB and $\Delta_{minus}$=0.01 dB may be used to achieve a 1% BLER (i.e., one CRC error out of 100 packets). In practice, if there is no CRC error, OLPC keeps on stepping down $SIR_{target}$ by 0.01 dB. When a CRC error happens, $SIR_{target}$ is increased by 1 dB.

The BLER may be updated every TTI. (The TTI is 20 ms for DTCH in UMTS.) Whenever the BLER is updated, $SIR_{target}$ may also be updated.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a tablet computer, a wearable computer, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method performed by a wireless communication device, the method comprising:

determining whether a first measure of a first quality parameter of a communication link is better than a first quality standard in response to a start of a transmission interval for a current packet;

in response to determining that the first measure of the first quality parameter is better than the first quality standard:

obtaining a second measure of a second quality parameter of the communication link, wherein the second quality parameter is different than the first quality parameter;

determining whether the second measure of the second quality parameter of the communication link is better than a second quality standard;

performing a partial packet decoding process on the current packet until the end of the current packet in response to determining that the second measure of the second quality parameter is better than the second quality standard;

where the partial packet decoding process is not performed on the current packet if the wireless communication device determines that the second measure of the second quality parameter is not better than the second quality standard.

2. The method of claim 1, wherein the first quality parameter is a block error rate of the communication link.

3. The method of claim 1, wherein the first quality parameter is a bit error rate of the communication link.

4. The method of claim 1, wherein the first quality parameter is a signal to noise ratio associated with a physical channel in communication link.

5. The method of claim 4, wherein the physical channel is a common pilot channel of the communication link.

6. The method of claim 5, wherein the common pilot channel is the Common Pilot Channel (CPICH) in UMTS.

7. The method of claim 1, wherein the second quality parameter is a signal to noise ratio (SNR) associated with the communication link.

8. The method of claim 1, wherein the second quality parameter includes a number of power control DOWN commands transmitted to a base station.

9. The method of claim 1, wherein the second quality parameter is based on information contained in the current packet.

10. The method of claim 1, wherein the second quality parameter includes a signal to noise ratio associated with a common pilot channel of the communication link.

11. The method of claim 10, wherein the common pilot channel is the Common Pilot Channel (CPICH) in UMTS.

12. The method of claim 1, wherein the second quality parameter includes a signal to noise ratio associated with uplink transmit power control (TPC) information sent through a downlink channel.

13. The method of claim 12, wherein the downlink channel is a Dedicated Physical Control Channel (DPCCH) of the communication link.

14. The method of claim 1, wherein said partial packet decoding process includes making one or more attempts to decode the current packet, wherein each of the one or more attempts is based on an amount of packet data that has been received up to the time of the attempt.

15. The method of claim 14, said performing the partial packet decoding process includes turning off a receiver until a start of a next transmission interval in response to a determination that one of said one or more attempts has been successful.

16. The method of claim 1, wherein the partial packet decoding process is performed after waiting a predetermined amount of time from the start of the transmission interval, wherein the predetermined amount of time is selected so that an effective coding rate of a received portion of the current packet after the predetermined amount of time is less than one.

17. The method of claim 1, wherein said obtaining the second measure of the second quality parameter includes obtaining measurements for a predetermined amount of time from the start of the transmission interval, wherein the predetermined amount of time is selected so that an effective coding rate of a received portion of the current packet after the predetermined amount of time is less than one.

18. A wireless communication device, the wireless communication device comprising:

an antenna for performing wireless communications over a communication link with a base station;

a processor configured to:

determine whether a first measure of a first quality parameter of a communication link is better than a first quality standard in response to a start of a transmission interval for a current packet;

in response to determining that the first measure of the first quality parameter is better than the first quality standard:

obtain a second measure of a second quality parameter of the communication link, wherein the second quality parameter is different than the first quality parameter;

determine whether the second measure of the second quality parameter of the communication link is better than a second quality standard;

performing a partial packet decoding process on the current packet until the end of the current packet in response to determining that the second measure of the second quality parameter is better than the second quality standard;

where the partial packet decoding process is not performed on the current packet if the wireless communication device determines that the second measure of the second quality parameter is not better than the second quality standard.

19. The wireless communication device of claim 18, wherein the first quality parameter is a block error rate of the communication link.

20. The wireless communication device of claim 18, wherein the first quality parameter is a bit error rate of the communication link.

21. The wireless communication device of claim 18, wherein the first quality parameter is a signal to noise ratio (SNR) of the communication link.

22. The wireless communication device of claim 18, wherein the second quality parameter is a signal to noise ratio (SNR) associated with the communication link.

23. The wireless communication device of claim 18, wherein the second measure of the second quality parameter is based on information contained in the current packet.

24. The wireless communication device of claim 18, wherein said partial packet decoding process includes making one or more attempts to decode the current packet prior to receipt of the entire packet, wherein each of the one or more attempts is based on an amount of packet data that has been received up to the time of the attempt.

25. The wireless communication device of claim 18, said performing the partial packet decoding process includes turning off a receiver until a start of a next transmission interval in response to a determination that one of said one or more attempts has been successful.

26. The wireless communication device of claim 18, wherein the partial packet decoding process is performed after waiting a predetermined amount of time from the start of the transmission interval, wherein the predetermined amount of time is selected so that an effective coding rate of a received portion of the current packet after the predetermined amount of time is less than one.

27. The wireless communication device of claim 18, wherein said obtaining the second measure of quality includes obtaining measurements for a predetermined amount of time from the start of the transmission interval, wherein the predetermined amount of time is selected so that an effective coding rate of a received portion of the current packet after the predetermined amount of time is less than one.

28. A non-transitory computer-accessible memory medium storing program instructions, wherein the program instructions, when executed by a communication device, cause the communication device to:

determine whether a first measure of a first quality parameter of a communication link is better than a first quality standard in response to a start of a transmission interval for a current packet; and in response to determining that the first measure of the first quality parameter is better than the first quality standard, then repetitively perform a partial packet decoding analysis procedure, wherein the program instructions are executable to:

obtain a second measure of a second quality parameter of the communication link, wherein the second quality parameter is different than the first quality parameter;

determine whether the second measure of the second quality parameter of the communication link is better than a second quality standard; and perform a partial packet decoding process on the current packet until the end of the current packet in response to determining that the second measure of the second quality parameter is better than the second quality standard;

where the partial packet decoding process is not performed on the current packet if the communication device determines that the second measure of the second quality parameter is not better than the second quality standard.

29. A computer system comprising:

a processor; and memory storing program instructions, wherein the program instructions, when executed by the processor, cause the processor to:

determine whether a first measure of a first quality parameter of a communication link is better than a first quality standard in response to a start of a transmission interval for a current packet; and in response to determining that the first measure of the first quality parameter is better than the first quality standard:

obtain a second measure of a second quality parameter of the communication link, wherein the second quality parameter is different than the first quality parameter;

determine whether the second measure of the second quality parameter of the communication link is better than a second quality standard; and perform a partial packet decoding process on the current packet until the end of the current packet in response to determining that the second measure of the second quality parameter is better than the second quality standard;

where the partial packet decoding process is not performed on the current packet if the computer system determines that the second measure of the second quality parameter is not better than the second quality standard.

\* \* \* \* \*